(12) United States Patent
Huck

(10) Patent No.: US 12,108,737 B2
(45) Date of Patent: Oct. 8, 2024

(54) LOW DENSITY PET LITTERS AND METHODS OF MAKING AND USING SUCH PET LITTERS

(71) Applicant: Société des Produits Nestlé S.A., Vevey (CH)

(72) Inventor: Nathan Foster Huck, Jackson, MO (US)

(73) Assignee: SOCIÉTÉ DES PRODUITS NESTLÉ S.A. (CH)

( * ) Notice: Subject to any disclaimer, the term of this patent is extended or adjusted under 35 U.S.C. 154(b) by 529 days.

(21) Appl. No.: 17/548,930

(22) Filed: Dec. 13, 2021

(65) Prior Publication Data
US 2022/0192144 A1 Jun. 23, 2022

Related U.S. Application Data

(60) Provisional application No. 63/126,905, filed on Dec. 17, 2020.

(51) Int. Cl.
| | |
|---|---|
| *A01K 1/015* | (2006.01) |
| *B01J 20/10* | (2006.01) |
| *B01J 20/28* | (2006.01) |
| *B01J 20/30* | (2006.01) |
| *B01J 20/32* | (2006.01) |

(52) U.S. Cl.
CPC ........... *A01K 1/0155* (2013.01); *B01J 20/106* (2013.01); *B01J 20/2803* (2013.01); *B01J 20/3021* (2013.01); *B01J 20/3042* (2013.01); *B01J 20/3204* (2013.01); *B01J 20/3234* (2013.01)

(58) Field of Classification Search
CPC .. A01K 1/0152; A01K 1/0154; A01K 1/0155; B01J 20/106; B01J 20/2803; B01J 20/3021; B01J 20/3042; B01J 20/3204; B01J 20/3234
See application file for complete search history.

(56) References Cited

U.S. PATENT DOCUMENTS

| | | |
|---|---|---|
| 2014/0174370 A1 | 6/2014 | Huck et al. |
| 2015/0181831 A1* | 7/2015 | Huck .................. A01K 1/0155 119/173 |
| 2017/0112088 A1 | 4/2017 | Huck et al. |
| 2017/0112089 A1 | 4/2017 | Huck et al. |

OTHER PUBLICATIONS

International Search Report and Written Opinion to PCT/2021/061657 dated May 6, 2022.

\* cited by examiner

*Primary Examiner* — Magdalena Topolski
*Assistant Examiner* — Spencer T Callaway

(57) ABSTRACT

Litter compositions comprising a blend of compacted granules comprising expanded perlite fines and coated granules, each coated granule comprising a non-agglomerated particle and a coating comprising a clumping agent on an outer surface of the particle are disclosed herein.

18 Claims, No Drawings

LOW DENSITY PET LITTERS AND METHODS OF MAKING AND USING SUCH PET LITTERS

CROSS REFERENCE TO RELATED APPLICATIONS

This application claims priority to U.S. Provisional Application Ser. No. 63/126,905 filed Dec. 17, 2020 the disclosure of which is incorporated in its entirety herein by this reference.

BACKGROUND

The present disclosure relates generally to a low density absorbent material which can be used in clumping pet litter. More specifically, the present disclosure is directed to low density pet litters comprising a blend of compacted granules comprising expanded perlite fines and coated granules comprising expanded perlite, and methods for making and using such pet litters.

Litter boxes are used by pets such as cats for elimination of urine and fecal matter. A litter box contains a layer of pet litter that receives the urine and fecal matter. The pet litter is granular, absorbent and either non-clumping or clumping. A clumping pet litter is a litter product in which the granules facilitate formation of clumps after the urine and fecal matter is deposited in the pet litter. The clumps are typically sifted from the litter box using a litter scoop and then discarded. Non-clumping pet litter is typically better at absorbing urine and thus removing urine odors, but replacing soiled non-clumping pet litter without emptying the entire box of litter can be difficult.

Traditionally, mineral based clumping litters rely on swelling clay as the clumping agent. The incorporation of this component into the litter substrate has been accomplished in a variety of ways including grinding, sizing and blending of various particle sizes of swelling and non-swelling clays. Other approaches include coating of sorbent core materials with swelling clay.

While swelling clay provides excellent absorption and granule bonding properties useful for clump formation, these same properties can negatively impact the overall sorption capacity of the litter substrate as a whole. This apparent paradox is a result of swelling clay having a relatively low liquid permeability once it is hydrated. As the swelling clay absorbs liquid, a relative liquid impermeable barrier is formed at the location of absorption, thus preventing liquid from penetrating further and being absorbed deeper within the core of the granule. The result is litter that requires a large amount of substrate, by volume, to create a clump and clumps whose shape or size is thin, brittle and easily broken or too deep and thus stick to the bottom of the box. These properties make clump removal more difficult.

Attempts to balance the mass inclusion level of swelling clay with desired clump formation and acceptable clump properties have included: various combinations of mass inclusion levels of swelling clay and non-swelling clay granules, various combinations of particle sizes of swelling and non-swelling clay granules, and coating agglomerated non-swelling clay with swelling clay. These approaches have had varying degrees of success, but due to their reliance on clay minerals, the litter products have an inherently high density (55-75 lbs/ft$^3$). Furthermore, even non-swelling clays have some inherent swelling capability, and due to their clay structure, some degree of plasticity when wet. The "mud" that non-swelling clays create can also be relatively liquid impermeable and as a result, face the same clump formation issues as described above for swelling clays.

Thus, there is a need for litter products that balance clump formation and liquid absorption, that also have a relatively low bulk density.

SUMMARY

Among the various aspects of the present disclosure is the provision of an animal litter composition that benefits from the functional capabilities of swelling clay while maximizing the overall sorptive and clumping capabilities of the substrate as a whole. Furthermore, the litter has a relatively low density and is thus lightweight.

Briefly, therefore, the present disclosure is directed to low density pet litters comprising a blend of i) compacted granules comprising expanded perlite fines and ii) coated granules, each coated granule comprising a non-agglomerated particle and a coating comprising a clumping agent on an outer surface of the non-agglomerated particle, wherein the compacted granules are present in an amount from about 5 wt. % to about 25 wt. %.

In some embodiments, the expanded perlite fines have a particle size of about 30 mesh or smaller.

In some embodiments, the compacted granules further comprise expanded perlite having a particle size of about 8 mesh or larger.

In some embodiments, the compacted granules comprising expanded perlite fines have a density from about 25 lb/ft$^3$ to about 45 lb/ft$^3$.

In some embodiments, the compacted granules further comprise a binder.

In some embodiments, the binder is selected from the group consisting of i) a starch, ii) a clay, and iii) a starch and a clay.

In some embodiments, the non-agglomerated particles comprise expanded perlite.

In some embodiments, the coated granules have a density from about 22 lb/ft$^3$ to about 26 lb/ft$^3$.

In some embodiments, the animal litter has a density less than about 30 lb/ft$^3$.

In some embodiments, the dried compacted granules comprise from about 1.0 wt. % to about 5.0 wt. % of water.

In some embodiments, the clumping agent is selected from the group consisting of bentonite, guar gum, starches, xanthan gum, gum Arabic, gum acacia, silica gel, and mixtures thereof. In some embodiments, the clumping agent comprises sodium bentonite.

In some embodiments, the animal litter further comprises an additive selected from the group consisting of an odor control agent, a fragrance, an anti-microbial agent, an anti-sticking agent, an agent for controlling pH, a dye, a coloring agent, a de-dusting agent, a disinfectant, and combinations thereof.

In some embodiments, the animal litter has a clump formation absorption volume from about 40% to about 50%.

In some embodiments, the animal litter has a clump volume from about 50 mL to about 60 mL In some embodiments, the animal litter has a clump thickness from about 29 mm to about 34 mm.

An advantage of one or more embodiments provided by the present disclosure is to provide improved pet litters.

A further advantage of the present disclosure is to provide pet litters that have a low density without sacrificing particle integrity or absorptive performance.

Still another advantage of the present disclosure is to provide pet litters that have both a low density and enhanced clumping efficiency.

Yet another advantage of the present disclosure is to enable lighter packages of pet litter without decreasing the volume thereof.

Another advantage of the present disclosure is to enable a pet owner to more easily purchase, transport and utilize a package of pet litter.

A further advantage of the present disclosure is to provide a low density granular absorbent with good clump formation absorption, clump size and clump thickness.

Yet another advantage of the present disclosure is to provide a clumping pet litter which allows relatively easy removal of clumps from the litter box.

Additional features and advantages are described herein and will be apparent from the following Detailed Description.

DETAILED DESCRIPTION

As used in this disclosure and the appended claims, the singular forms "a," "an" and "the" include plural referents unless the context clearly dictates otherwise. Thus, for example, reference to "a material" or "the material" includes two or more materials.

The words "comprise," "comprises" and "comprising" are to be interpreted inclusively rather than exclusively. Likewise, the terms "include," "including" and "or" should all be construed to be inclusive, unless such a construction is clearly prohibited from the context.

However, the devices and compositions disclosed herein may lack any element that is not specifically disclosed. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. "Consisting essentially of" means that the embodiment comprises more than 50% of the identified components, at least 75% of the identified components, at least 85% of the identified components, or at least 95% of the identified components, for example at least 99% of the identified components.

The term "and/or" used in the context of "X and/or Y" should be interpreted as "X," or "Y," or "X and Y." Where used herein, the terms "example" and "such as," particularly when followed by a listing of terms, are merely exemplary and illustrative and should not be deemed to be exclusive or comprehensive. Any embodiment disclosed herein can be combined with any other embodiment disclosed herein unless explicitly stated otherwise.

All percentages expressed herein are by weight of the total weight of the composition unless expressed otherwise. As used herein, "about" and "approximately" are understood to refer to numbers in a range of numerals, for example the range of −10% to +10% of the referenced number, preferably within −5% to +5% of the referenced number, more preferably within −1% to +1% of the referenced number, most preferably within −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Numerical adjectives, such as "first" and "second," are merely used to distinguish components. These numerical adjectives do not imply the presence of other components, a relative positioning, or any chronological implementation. In this regard, the presence of a "second widget" does not imply that a "first widget" is necessarily present. Further in this regard, a "second widget" can be used before, after, or simultaneously with any "first widget."

The terms "pet" and "animal" are used synonymously herein and mean any animal which can use a litter box, non-limiting examples of which include a cat, a dog, a rat, a ferret, a hamster, a rabbit, an iguana, a pig or a bird. The pet can be any suitable animal, and the present disclosure is not limited to a specific pet animal. The term "elimination" means urination and/or defecation by a pet.

As used herein, the term "litter" means any substance that can absorb animal urine and/or decrease odor from animal urine and/or feces. A "clumping litter" forms aggregates in the presence of moisture, the aggregates distinct from the other litter in the litter box. A "non-clumping litter" does not form distinct aggregates.

The term "clump formation absorption" is a measure of the amount of litter required to absorb a given amount of liquid to form a clump and is an assessment of the absorption efficiency of the litter. The clump formation absorption by mass is calculated using the following equation: clump formation absorption by mass (%)=(Mass of Liquid Added/(Mass of Clump-Mass of Liquid Added))×100. The clump formation absorption can also be measured by volume to compare the clumping efficiencies of litter having different densities. The clump formation absorption by volume is calculated using the following equation: clump formation absorption by volume (%)=(Volume of Liquid Added/((Mass of Clump-Mass of liquid added)×Density of Litter))×100.

The term "clump volume" or "clump litter volume" refers to the overall size of the clump and is calculated by dividing the mass of litter by the density of the litter. The clump volume is another measure of the absorption efficiency of the litter with smaller clumps indicating more efficient absorption. When calculating clump litter volume there is an assumption that the volume of the clump is predominantly litter volume, and that the volume of the water is absorbed within the litter.

The term "clump thickness" refers to the vertical measurement of a clump when the clump is resting on a horizontal surface. For example, a flatter clump will have a smaller clump thickness. If a clump is very thick it may reach the bottom of the litter box and stick making removal more difficult. If a clump is very thin it may break during removal from the litter box.

The term "clump cohesion" refers to the ability of a clump to remain intact when an external force is applied and provides an assessment of clump integrity. A clump with a lower clump cohesion value will have a greater chance of breaking during litter box use or clump removal, making litter box cleaning more difficult.

The term "litter box" means any apparatus that can hold pet litter, for example a container with a bottom wall and one or more side walls, and/or any apparatus configured for litter to be positioned thereon, for example a mat or a grate. As a non-limiting example, a litter box may be a rectangular box having side walls that have a height of at least about six inches.

The term "mesh" is defined by the ASTM E-11 U.S.A. standard specification for sieves. As used herein, "size" of a particle refers to the length of the longest dimension of the particle.

The methods and devices and other advances disclosed herein are not limited to particular methodologies, protocols, and reagents because, as the skilled artisan will appreciate, they may vary. Further, the terminology used herein is for the purpose of describing particular embodiments only and does not limit the scope of that which is disclosed or claimed.

Unless defined otherwise, all technical and scientific terms, terms of art, and acronyms used herein have the meanings commonly understood by one of ordinary skill in the art in the field(s) of the present disclosure or in the field(s) where the term is used. Although any compositions, methods, articles of manufacture, or other means or materials similar or equivalent to those described herein can be used, the preferred devices, methods, articles of manufacture, or other means or materials are described herein.

The present inventors found that blending i) compacted granules comprising expanded perlites fines with ii) coated granules, each coated granule comprising a non-agglomerated particle and a coating comprising a clumping agent on an outer surface of the particle, produces a clumping litter composition with low density and high absorption by volume. Furthermore, the inventors unexpectedly found that the high absorption, enabled in part by the presence of non-swelling compacted granules comprising expanded perlite fines, does not diminish clumping properties such as clump volume, clump thickness, and clump integrity.

An aspect of the disclosure is an animal litter comprising a blend of i) compacted granules comprising expanded perlite fines and ii) coated granules, each coated granule comprising a non-agglomerated particle and a coating comprising a clumping agent on an outer surface of the particle; wherein, the compacted granules are present in an amount from about 5 wt. % to about 25 wt. %.

By adjusting the amount of the compacted granules, that contain expanded perlites fines, in the blend, the overall quantity of litter (by volume) necessary to form a clump can be reduced. Ultimately, the clumps formed by the litter require less litter to form, and the clumps have a shape that makes them more resistant to breakage and less likely to stick to the bottom of the litter box.

The compacted granules comprising expanded perlite fines can be prepared using a compacting roll. The compacting can be performed at a compaction roll back-pressure of at least about 500 psi (3447 kPa), for example about 500 psi (3447 kPa) to about 1,300 psi (8963.18 kPa), such as about 500 psi (3447 kPa) to about 800 psi (5516 kPa) or about 800 psi (5516 kPa) to about 1,300 psi (8963.18 kPa). In one embodiment, the size of the expanded perlite fines is not greater than about 30 mesh (that is, having a diameter not greater than 595 microns). As a non-limiting example, about 95% or more of the perlite fines in the compacted granules can be smaller than 30 mesh (that is, having a diameter smaller than 595 microns) and no greater than about 5% of the compacted granules can be up to 4 mesh (that is, having a diameter greater than 4.76 mm).

In an embodiment, the compacted granules comprising expanded perlite fines are prepared as disclosed in U.S. Patent App. Pub. No. 2017/0112088 or U.S. Patent App. Pub. No. 2017/0112089 to Huck et al., herein incorporated by reference in their entirety.

The present disclosure is not limited to a specific means of forming the compacted granules, and other means of compaction or agglomeration of the perlite fines can be employed additionally or alternatively to compacting rolls. These other means include, for example, tumble/growth agglomeration; low-, medium-, or high-pressure agglomeration; punch and die; roller press; high shear mixer granulator; extrusion; and combinations thereof.

Perlite is a generic term for a naturally occurring siliceous rock. One feature which sets perlite apart from other volcanic glasses is that when heated to a suitable point in its softening range, perlite expands from four to twenty times the original volume. This expansion is due, at least in part, to the presence of two to six percent combined water in the crude perlite rock. Firing, i.e., quickly heating to above 1,600° F. (871° C.), causes the crude rock to pop in a manner similar to popcorn yielding a very open, highly porous structure referred to as expanded perlite.

In an embodiment, the amount of expanded perlite fines in a compacted granule represents the majority of the material in the granule. In an embodiment the amount of expanded perlite fines in a compacted granule is from about 80 wt. % to about 95 wt. %. In an embodiment, the amount of expanded perlite fines in a compacted granule is from about 90 wt. % to about 95 wt. %, about 93 wt. % to about 95 wt. %, for example about 93 wt. % to about 94 wt. %, or about 95 wt. % of the material. In an embodiment, the expanded perlite fines comprise particles eliminated in step 101 of the method 100 disclosed in U.S. Patent App. Pub. No. 2014/0174370.

In an embodiment, the compacted granules further comprise expanded perlite particles having a size of about 8 mesh or larger. In an embodiment, the expanded perlite particles having a size of about 8 mesh or larger comprise particles eliminated in step 101 of the method 100 disclosed in U.S. Patent App. Pub. No. 2014/0174370.

In an embodiment, the amount of the water in the compacted granule is about 1 wt. % to about 5 wt. % of the material, for example about 2 wt. % of the material.

In an embodiment, the amount of the binder in the compacted granule is about 3.0 wt. % to about 5.0 wt. % of the material, for example about 3.0 wt. % to about 4.5 wt. % or about 3.5 wt. % to about 4.0 wt. % of the material. In some embodiments, the amount of binder is about 3.0 wt. %, about 4.0 wt. % or about 5.0 wt. %. The binder can be starch and/or clay. In some embodiments, the starch (if any) comprises a cereal starch, for example starch from one or more of rice, millet, wheat, corn or oats. In a preferred embodiment, the starch (if any) comprises pre-gelled cereal starch and can include any waxy or high amylose varieties thereof. The clay can be swelling or non-swelling. In some embodiments, the clay (if any) comprises one or more clay minerals selected from the group consisting of kaolin, smectite, illite, chlorite, sepiolite, and attapulgite. In one embodiment, the clay (if any) comprises a montmorillonite smectite, for example, sodium or calcium montmorillonite.

At least a portion of the binder can be added to the expanded perlite fines as a dry mix before the compacting. Alternatively or additionally, at least a portion of the binder can be pre-blended with at least a portion of the water and then added to the expanded perlite fines before the compacting.

In an embodiment, the compacting forms a compacted material such as sheets and/or briquettes of compacted expanded perlite fines. However, the compacted material is not limited to a specific shape, size or form. Furthermore, as noted above, the present disclosure is not limited to a specific means of compaction or agglomeration of the perlite fines to form the compacted material. For example, the compacted material can be in the form of a pellet (e.g., a flattened pellet), a tablet or a puck.

Then the compacted material can be ground and/or crushed, for example by a milling system or any other suitable apparatus known to one skilled in the art, to obtain granules of compacted material comprising expanded perlite. One or more sieves can be used to obtain the granules of compacted material comprising expanded perlite that have a desired size by separating the particles having the desired size from the remainder of the particles. The desired particle size is preferably from about 30 mesh (595 microns) to about 8 mesh (2,380 microns). Preferably, the granules of compacted material comprising expanded perlite are not evenly distributed within the size range. Commercially available shaker screens may be utilized.

The granules of compacted material comprising expanded perlite that have the desired size can be subjected to drying to remove moisture from the granules without substantially damaging the particles. For example, the granules can be transferred to a dryer such as a fluidized bed dryer. The resultant moisture level can be about 1% to about 5%, for example about 2%.

The dried granules of compacted material comprising expanded perlite fines have a density from about 25 lb/ft$^3$ to about 45 lb/ft$^3$. In some embodiments, the density is from about 30 lb/ft$^3$ to about 40 lb/ft$^3$. In another embodiment, the density is about 40 lbs/ft$^3$ or about 0.65 g/mL.

Various additives may be optionally applied to the dried compacted granules. Non-limiting examples of suitable additives include an odor control agent, a fragrance, an anti-microbial agent, an anti-sticking agent, an agent for controlling pH, a dye, a coloring agent, a de-dusting agent, a disinfectant, and combinations thereof. In an embodiment, at least a portion of the dried compacted granules are coated with a colorant.

In an embodiment, the coated granules comprise non-agglomerated particles and a coating comprising a clumping agent on an outer surface of the non-agglomerated particles. In some embodiments, the non-agglomerated particles comprise expanded perlite. In another embodiment, the non-agglomerated particles consist essentially of expanded perlite. In some embodiments, the clumping agent is selected from the group consisting of bentonite, guar gum, starches, xanthan gum, gum Arabic, gum acacia, silica gel, and mixtures thereof. In one embodiment, the clumping agent consists essentially of sodium bentonite. In another embodiment, the coated granules comprise non-agglomerated expanded perlite particles coated with sodium bentonite.

In general, methods for preparing the coated granules comprising non-agglomerated particles and a coating comprising a clumping agent on an outer surface of the non-agglomerated particles include screening the non-agglomerated particles to eliminate particles smaller than the range of particle sizes selected for the particular embodiment. For example, non-agglomerated particles may be screened to eliminate particles smaller than 50 mesh (U.S. sieve size), smaller than 40 mesh (U.S. sieve size), or smaller than 30 mesh (U.S. sieve size). Commercially available shaker screens may be utilized. In some embodiments, the non-agglomerated particles may be screened to eliminate particles larger than 8 mesh.

In some embodiments, the preparation methods for the coated granules comprises placing the non-agglomerated particles in an enrobing machine to agitate the particles. This assists in the reduction of fines which, in turn, aids in dust abatement. The non-agglomerated particles can then be wetted with water. The water may be added in the enrobing machine.

The wetted non-agglomerated particles are then coated. The coating may comprise a clumping agent, e.g. sodium bentonite. By way of example, centrifugal coating methods can be employed. For instance, a batch of expanded perlite particles are metered onto a feed belt by volume and fed into the coater as it rotates. The perlite particles roll inside the chamber of the coater in the direction of rotation. In an optional preconditioning step, the perlite particles are spun in the coater for a period of time (e.g. 30 to 60 seconds) prior to coating. The clumping agent, is then metered into the coater. In general, the quantity of clumping agent added into the coater is based on the volume of the perlite particles. In one embodiment, for example, from about 5 to about 25 pounds of sodium bentonite are added per cubic foot of expanded perlite. Other coating materials, such as guar gum, may be included in the coater in addition to or in lieu of a bentonite-based clumping agent. Such materials may be added as a mixture, along with the bentonite, or they may be added in a separate step.

As the coating is metered into the chamber of the coater, it combines with the wet, spinning particles and forms a coating on the particles to form coated granules.

In some embodiments, the coated granules have a density from about 22 lb/ft$^3$ to about 26 lb/ft$^3$.

In some embodiments, the animal litter is prepared by dry blending i) compacted granules comprising expanded perlite fines and ii) coated granules, each coated granule comprising a non-agglomerated particle and a coating comprising a clumping agent on an outer surface of the non-agglomerated particle.

In an embodiment, the compacted granules comprising expanded perlite fines are present in the litter in an amount from about 5 wt. % to about 25 wt. %. In some embodiments, the compacted granules are present in the litter in an amount of about 5 wt. %, about 10 wt. %, about 15 wt. %, about 20 wt. %, or about 25 wt. %. In some embodiments, the compacted granules are present in the litter in an amount of about 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, or 25 wt. %.

In some embodiments, the litter may contain various additives optionally applied to compacted granules, the coated granules, or the animal litter that is a blend of the compacted granules and the coated granules. Non-limiting examples of suitable additives include an odor control agent, a fragrance, an anti-microbial agent, an anti-sticking agent, an agent for controlling pH, a dye, a coloring agent, a de-dusting agent, a disinfectant, and combinations thereof. In an embodiment, at least a portion of the dried compacted granules are coated with a colorant.

In some embodiments, the animal litter that is a blend of the compacted granules and coated granules has a density less than about 30 lb/ft$^3$.

In one embodiment, the animal litter has a clump formation absorption volume from about 40% to about 50%. In some embodiments, the animal litter has a clump formation absorption volume of about 40%, 41%, 42%, 43%, 44%, 45%, 46%, 47%, 48%, 49% or 50%.

In one embodiment, the animal litter has a clump cohesion from about 95% to about 99%. In some embodiments, the animal litter has a clump cohesion greater than about 97%, greater than about 98%, or greater than about 99%.

In one embodiment, the animal litter has a clump volume from about 55 mL to about 60 mL. In other embodiments, the animal litter has a clump volume of about 55 mL, about 56 mL, about 57 mL, about 58 mL, about 59 mL, or about 60 mL.

Another aspect of the present disclosure is a sealed package at least partially enclosing any of the embodiments of the pet litter disclosed herein, for example a sealed box or a sealed bag containing such pet litter. A further aspect of the present disclosure is a method of using a pet litter, the method comprising positioning at least a portion of a pet litter contained by a package into a litter box. The method can manage animal waste, such as cat urine; prevent or treat cat out-of-box elimination; or treat or prevent lower urinary tract diseases in a cat, such as urinary plugs, struvite or oxalate stones, idiopathic cystitis, or renal reflux. In an embodiment, one or more of the pet litters disclosed herein are used to treat a cat having an out-of-box elimination issue. As used herein, a cat that has "an out-of-box elimination issue" is a cat that has eliminated outside of the litter box at least once in the last month, and in an embodiment eliminated outside of the litter box at least once in the last week.

EXAMPLES

The following non-limiting examples are illustrative of embodiments of the pet litters provided by the present disclosure and advantages thereof.

Example 1: Compacted Granules Preparation

Compacted granules were prepared using the following method.
1. A 13.8% starch slurry was prepared by mixing starch and water using a tank agitator.
2. Expanded perlite fines (76.8%) and starch slurry (23.2%) were continuously blended into a set of compacting rolls.
3. The compaction rolls, having a back pressure force set-point of 500 psi, formed the in-feed into briquettes.
4. The briquettes were then crushed and sized to −8/30 mesh (U.S. sieve).
5. The screened material was then dried to a moisture content of approximately 2%.

Composition of the dried compacted granules was: 94.1% expanded perlite fines, 3.9% starch, and 2% water.

Example 2: Coated Granules Preparation

Coated granules were prepared using the following method.
1. Expanded perlite was misted with water while being conveyed from bulk sack to a batch coater. Upon reaching the batch coater, the expanded perlite moisture content was approximately 14% by mass.
2. Approximately 4 ft$^3$ or 23.62 lb of the expanded perlite from Step 1 was added to a spinning batch-type agricultural seed coater (Cimbria Heid).
3. Water was added (22.34 lbs) using spray nozzles installed inside the coater. Approximate addition time was 12 seconds.
4. After water addition, sodium bentonite (64 lbs) was added to the coater over a 30 second time period.
5. Immediately after the bentonite addition, air atomized water (2.08 lbs) was applied. Approximate addition time was 6.5 seconds.
6. The material was allowed to spin for 5 seconds.
7. The discharge port of the coater was opened and the discharged material was collected.
8. The material was dried using a fluid bed dryer (Carrier) and the final moisture was recorded.

Example 3: Dry Blending of Compacted Granules and Coated Granules

Litter blends of compacted granules and coated granules were prepared using the following method.
1. The desired amount of litter blend was determined to be 10 lbs.
2. The total target mass of 10 lbs was multiplied by the desired percentage of compacted granules (e.g. 5.0%) to determine the mass of compacted granules needed in the final blend (e.g. 0.50 lbs).
3. The mass of compacted granules calculated in step 2 was subtracted from the desired total litter amount (10 lb) to determine the mass of coated granules required (9.50 lbs).
4. The compacted granules (0.5 lbs) and coated granules (9.5 lbs) were combined in a benchtop tumble mixer and allowed to spin for approximately 30 sec.
5. After mixing, the blended composition was removed from the tumbler and evaluated for density, clumping and absorption performance.
6. Additional litter compositions were prepared and evaluated using steps 1-5 above by altering the % inclusion levels of the compacted granules to be 10%, 15%, 20%, 25%, and 50%.

The masses of the blend components and the resulting properties are reported in Table 1.

Example 4: Loose Fill Bulk Density Measurement

The bulk densities of the compacted granules, coated granules and blended litter were measured using a filling hopper (800 284-5779 Seedburo®; part number 151 Filling Hopper complete with 64P Pan), stand, and pint sized (550.06 cm$^3$ dry volume) sample cup according to the procedure below:
1. The sample was poured into the filling hopper until it was full.
2. Next, the empty pint cup was placed on a balance and the balance was zeroed.
3. The cup was then placed beneath the filling hopper. The distance between the filling hopper discharge, and the top edge of the cup was set at 2 inches.
4. The filling hopper discharge slide was then opened to allow product to fall into the empty sample cup. The sample was allowed to flow until the cup was full, and then for an additional 1 to 2 seconds of overflow.
5. A straight edge was then used to remove excess product from the top of the cup; leveling the cup contents with the rim of the cup.
6. The cup with the sample was then returned to the balance and the weight of the sample recorded.
7. Steps 1-6 were repeated three times.
8. Mass value was converted to pounds per cubic foot (lb/ft$^3$) by multiplying by 0.113358 (1 g/dry-pint=113358 lb/ft$^3$).
9. The average bulk density values in lb/ft$^3$ were recorded. These values were further converted into density units of g/mL by multiplying them by 0.01601846.

The average bulk density values in lb/ft$^3$ and g/mL for the compacted granules, coated granules and litter blends are reported in Table 1.

Example 5: Clump Formation Absorption by Volume and Clump Cohesion Measurements In order to compare the efficiency of sample litters in a manner that reflected actual use it was necessary to determine how much litter was required to absorb a given volume of urine. Because litter can have different densities, the value was more relevant when considered on a volumetric basis (volume of urine absorbed per volume of litter). By expressing the value as a %, it was possible to compare the Clump Formation Absorption by Volume across litters of differing densities. The method used to calculate the Clump Formation Absorption by Volume is provided below.

TABLE 1

Summary of Testing Results

| Sample | Mass of Coated Granules lbs | Mass of Compacted granules lbs | Density lbs/ft$^3$ | Density g/mL | Clump Form. Absorp. by Vol % | Clump Litter Vol. 15 min (mL) | Clump Cohesion 15 min (%) | Clump Cohesion 24 h (%) | Clump Thickness 24 h (mm) |
|---|---|---|---|---|---|---|---|---|---|
| Compacted granules (Ex 1) | 0.00 | 10.00 | 40.70 | 0.652 | NA | NA | NA | NA | NA |
| Coated Granules (Ex 2) | 10.00 | 0.00 | 23.53 | 0.377 | 43.79 | 57.1 | 98.64 | 98.00 | 33.5 |
| Blend 1 (Ex. 3) | 9.50 | 0.50 | 24.17 | 0.387 | 44.22 | 56.6 | 98.57 | 97.93 | 33.7 |
| Blend 2 (Ex. 3) | 9.00 | 1.00 | 25.79 | 0.413 | 44.66 | 56.0 | 98.38 | 97.95 | 33.2 |
| Blend 3 (Ex. 3) | 8.50 | 1.50 | 27.33 | 0.438 | 44.87 | 55.7 | 98.08 | 97.94 | 32.0 |
| Blend 4 (Ex. 3) | 8.00 | 2.00 | 26.55 | 0.425 | 43.02 | 58.2 | 98.10 | 97.55 | 32.4 |
| Blend 5 (Ex. 3) | 7.50 | 2.50 | 26.50 | 0.425 | 43.06 | 58.3 | 97.73 | 97.37 | 29.5 |
| Blend 6 (Ex. 3) | 5.00 | 5.00 | 32.14 | 0.515 | 37.66 | 66.6 | 93.37 | 95.78 | 35.5 |

1. An 8" diameter sieve with ¾" mesh was stacked on top of a sieve pan and placed on the bottom of a support stand.
2. A trap door assembly was attached to the support stand and positioned ten inches above the ¾" sieve.
3. A representative sample of litter material was added to a litter testing pan to a depth of 3 inches.
4. A self-leveling burette was positioned on a support stand 3 inches above the litter surface. The setup was used to dispense 25 mL aliquots of feline urine to the litter surface, thus forming a clump in the litter. The process was repeated in a variety of locations in the litter pan until the desired number of clumps was formed.
5. At the end of the desired time interval, e.g. 15 min or 24 hours, the clump was removed from the litter, and its mass recorded as W1.
6. The average mass of the 25 mL portions of urine delivered by the self-leveling burette was determined by delivering (3) 25 mL portions in a vessel, measuring the mass and dividing by (3). The value was 25.7 g.
7. The mass of litter consumed in the formation of the clump or Clump Litter Mass (CLM) was then determined by the following formula: CLM=W1−25.7 g.
8. Next, the volume of litter consumed during formation of the clump or Clump Litter Volume (CLV was determined using the formula: CLV=CLM/density of the litter (g/mL).
9. The Clump Litter Volume was recorded.
10. The Clump Formation Absorption by Volume was determined using the formula:

Clump Formation Absorption %=(25 mL/CLV)×100.

11. The clump obtained in step 5 was centered on the trap door mechanism assembled in Step 2.
12. The lever was actuated to release the trap door, allowing the clump to fall onto the ¾" test sieve.
13. The clump was carefully removed from the screen in a manner which allowed loose material to fall free of the clump, but not in a manner which caused additional damage to the clump. If the clump broke into pieces, the largest piece retained on the ¾" screen was selected. If nothing was retained on the screen, the result is zero (0) weight.
14. The clump or largest piece was weighed and the mass recorded as W2.

The Clump Cohesion (%) was calculated by the formula: Clump cohesion (%)=[(W2, final weight)/(W1, initial weight)]×100

Example 6: Clump Thickness Measurement

CONCLUSIONS

The results show that the blended litter compositions with between 5-25% compacted granules comprising expanded perlite fines have acceptable densities, comparable to the base litter containing only coated granules. The litter Blends 1 through 5 have good clump volume and have good absorption. Specifically, the clump volume is less than 58.3 and the clump formation absorption is greater than about 43%. Blends 1 to 3 show increased absorption compared to the base litter containing only coated granules. Additionally, the litter Blends 1 through 5 have surprisingly good particle integrity with clump cohesion values equal to or greater than 97.3%. In other words, the advantages achieved by using compacted granules comprising expanded perlite fines in litters of the present disclosure (e.g. increased absorption) are not offset by diminished performance of the litter (e.g. clump litter volume and clump cohesion).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. An animal litter comprising a blend of:
   i) compacted granules comprising expanded perlite fines and
   ii) coated granules, each coated granule comprising a non-agglomerated particle and a coating comprising a clumping agent on an outer surface of the non-agglomerated particle, wherein the compacted granules are present in an amount from about 5 wt. % to about 25 wt. %.

2. The animal litter of claim 1, wherein the expanded perlite fines have a particle size of about 30 mesh or smaller.

3. The animal litter of claim 1, wherein the compacted granules further comprise expanded perlite particles having a size of about 8 mesh or larger.

4. The animal litter of claim 1, wherein the compacted granules have a density from about 25 lb/ft$^3$ to about 45 lb/ft$^3$.

5. The animal litter of claim 1, wherein the compacted granules further comprise a binder.

6. The animal litter of claim 5, wherein the binder is selected from the group consisting of (i) a starch, (ii) a clay, and (iii) a starch and a clay.

7. The animal litter of claim 1, wherein the non-agglomerated particle comprises expanded perlite.

8. The animal litter of claim 1, wherein the coated granules have a density from about 22 lb/ft$^3$ to about 26 lb/ft$^3$.

9. The animal litter of claim 1 having a density less than about 30 lb/ft$^3$.

10. The animal litter of claim 1, wherein dried compacted granules comprise about 1 wt. % to about 5.0 wt. % of water.

11. The animal litter of claim 1, wherein the clumping agent is selected from the group consisting of bentonite, guar gum, starches, xanthan gum, gum Arabic, gum acacia, silica gel, and mixtures thereof.

12. The animal litter of claim 11, wherein the clumping agent comprises sodium bentonite.

13. The animal litter of claim 1, wherein the animal litter has a clump formation absorption volume from about 40% to about 50%.

14. The animal litter of claim 1, wherein the animal litter has a clump formation absorption volume from about 43% to about 45%.

15. The animal litter of claim 1, wherein the animal litter has a clump volume from about 50 mL to about 60 mL.

16. The animal litter of claim 1, wherein the animal litter has a clump volume from about 55 mL to about 59 mL.

17. The animal litter of claim 1, wherein the animal litter has a clump thickness from about 29 mm to about 34 mm.

18. The animal litter of claim 1, further comprising an additive selected from the group consisting of an odor control agent, a fragrance, an anti-microbial agent, an anti-sticking agent, an agent for controlling pH, a dye, a coloring agent, a de-dusting agent, a disinfectant, and combinations thereof.

* * * * *